L. L. SCHAUER.
INDICATOR OF STRIPPED THREADS.
APPLICATION FILED JULY 9, 1921.
1,416,579.
Patented May 16, 1922.
2 SHEETS—SHEET 2.
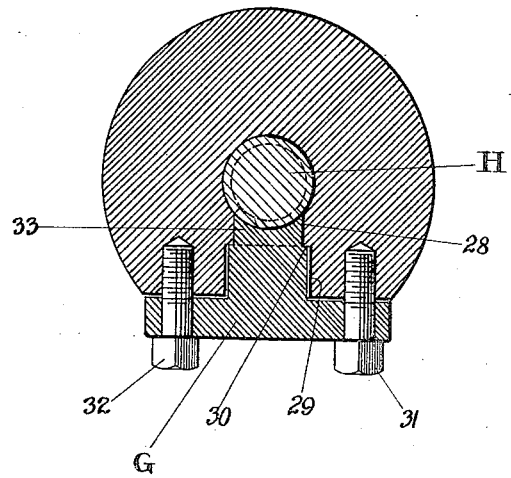
Fig. 4.
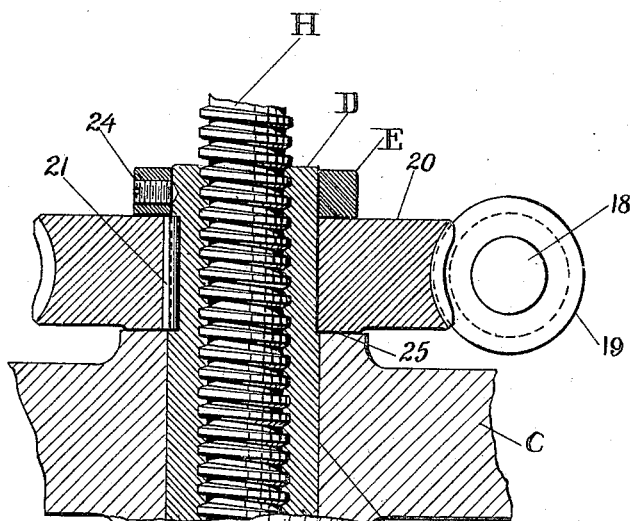
Fig. 5.
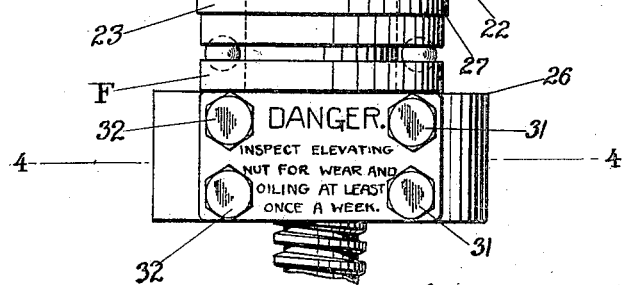
INVENTOR
Lawrence Lee Schauer
BY
Albert F. Nathan
ATTORNEY

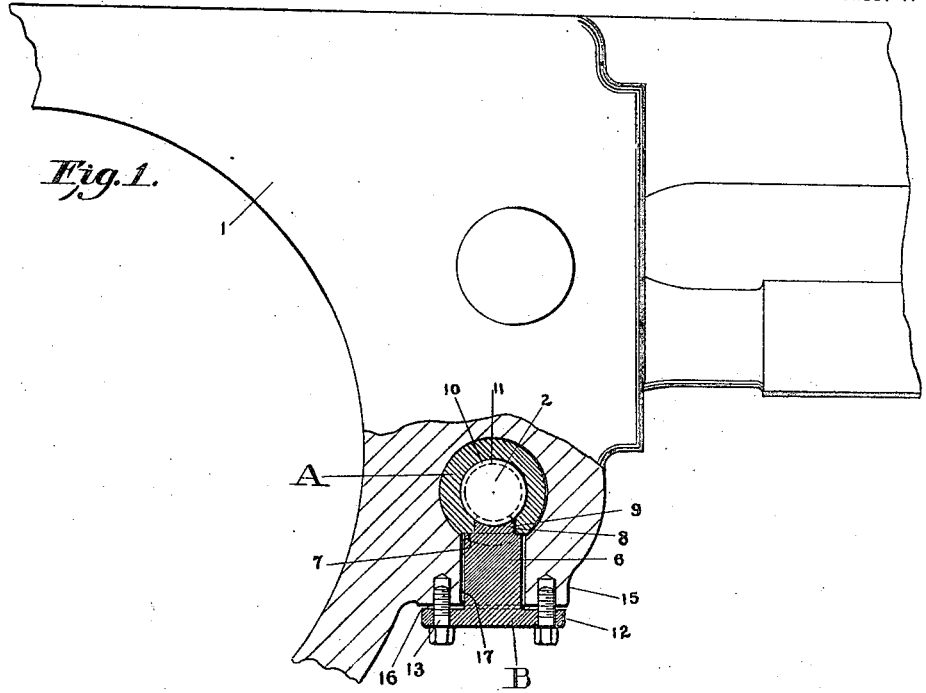
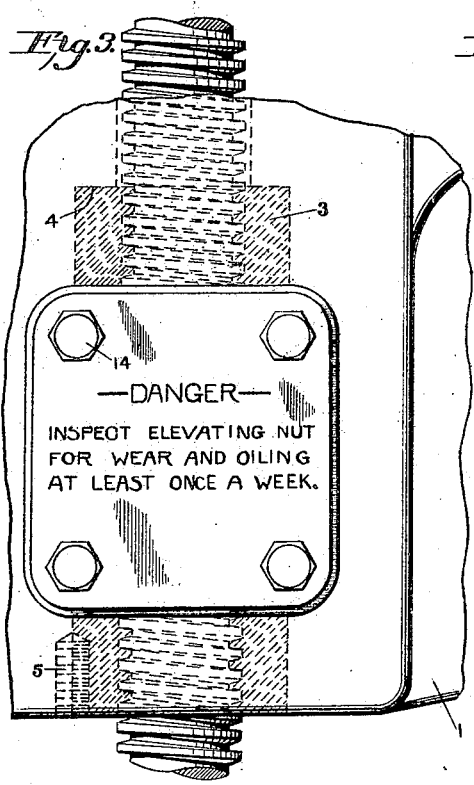
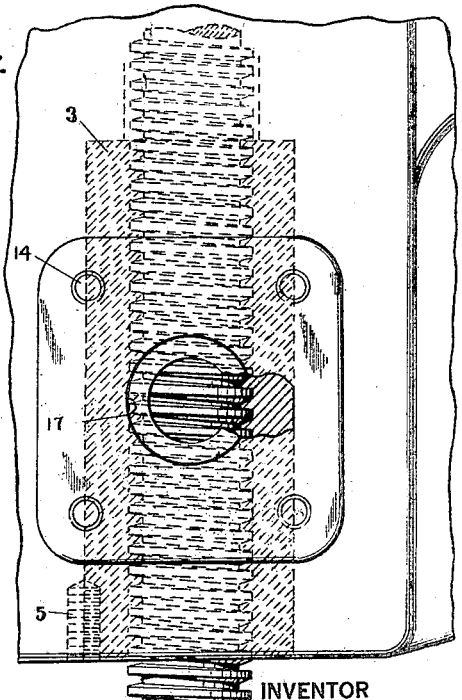

UNITED STATES PATENT OFFICE.

LAWRENCE LEE SCHAUER, OF CINCINNATI, OHIO, ASSIGNOR TO THE CINCINNATI BICKFORD TOOL COMPANY, OF CINCINNATI, OHIO, A CORPORATION OF OHIO.

INDICATOR OF STRIPPED THREADS.

1,416,579.   Specification of Letters Patent.   Patented May 16, 1922.

Application filed July 9, 1921. Serial No. 483,629.

*To all whom it may concern:*

Be it known that I, LAWRENCE LEE SCHAUER, a citizen of the United States, and residing at Cincinnati, in the county of Hamilton and State of Ohio, have invented a new and Improved Indicator of Stripped Threads, of which the following specification is a full disclosure.

This invention deals with means for avoiding accidents occasioned by excess wear on the threads of a heavy-duty nut employed in combination with a screw, or the like, to elevate and sustain loads of considerable magnitude.

In numerous instances in the mechanical arts, it is customary to employ a long screw in threaded relation with a comparatively short nut for the purpose of raising heavy weights such, for example, as a major frame-element of a machine-tool. Depending upon the manner of installation, either the nut or the screw is rotated during the raising operation, and it not infrequently happens that on account of grit, improper lubrication, or the like, the thread of the nut becomes worn away much faster than the user suspects; the wear being more pronounced as to the nut than as to the screw by reason of the limited bearing surface of the nut as compared with that of the screw. In time, the wear will so weaken the threads of the nut that they will be of insufficient strength to maintain the weight they are intended to carry; whereupon such threads may become stripped and the weight will be permitted to drop without restraint; to the damage of the machine and to the injury of anyone who happens to be in the path of the descending weight.

Of course, the customary solid formation of a heavy-duty nut precludes any observation of its internal threads so long as it is in engagement with the screw and, furthermore, the nut is almost invariably positioned at an inaccessible point and hence the condition of its threads does not admit of being easily ascertained by the user. To do so, it is necessary to dis-assemble the mechanism; all of which entails so much labor and inconvenience that an inspection is rarely, if ever, made. It is, therefore, extremely desirable to provide some construction whereby the condition of a heavy-duty nut may be ascertained with the greatest of ease and this invention is, accordingly, addressed to that primary object.

It is likewise an objective to attain that end without departing from or sacrificing the rugged, simple and substantial features of a conventional nut.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 is a fragmentary plan, partly in section, of the arm of a drilling-machine equipped with a safety nut in accordance with this invention. Fig. 2 is a front elevation; partly broken away to show the manner in which a minor section of the herein proposed nut may be removed for purposes of inspection. Fig. 3 is a front-elevation showing the parts in their normal relation. Figs. 4 and 5 show a rotary inspective nut.

Referring to the drawings, 1 designates a portion of a conventional arm or a frame-element of machine tool (in this instance a drilling-machine) through which passes a screw 2; such a screw 2 being normally in threaded-engagement with a substantially solid nut 3 which, in any appropriate manner, is securely mounted in the arm; as, for example, by being arranged in the socket 4, and held therein by the set screw 5.

Instead, however, of being literally made in the conventional manner, this nut may be regarded as consisting of two sections, the major section A or nut proper being retained in the conventional manner and the minor section B being adapted and arranged to be very easily removed to permit of a thorough and minute examination.

The removable section B is preferably in the shape of a plug having a cylindrical body-portion 6 provided with a shoulder 7 adapted to bear against a corresponding seat provided by the nut which has, likewise, a circular hole 8 into which projects a reduced insert-portion 9 faced with thread-sections corresponding in pitch, diameter and number to the threads 11 of the nut. These parts are so fitted and machined that, when the plug is in its normal position, its threaded inner-most face is an accurate continuation of the threaded interior of the nut proper. For the purpose of holding the detachable insert in place, it may be provided with a portion 12 in the nature of a cover plate; said portion being provided with apertures 13 adapted to receive bolts 14 whereby it may be secured to a suitable portion 15 of the arm and thereby held in true thread-alignment; preferably providing a little clearance as indicated by 16 to ensure a firm and accurate seating on the shoulder 7. This cover-plate is preferably provided with a legend emphasizing the necessity of making periodic inspections of the thread of the nut and, by reason of the convenience with which this plug may be dis-assembled, it is a simple matter for the user at any time to ascertain precisely the condition of the threads of the nut; the detachable section presenting a true sample, so to speak, of the condition of the nut. It will be understood that, inasmuch, as the detachable insert is at all times subjected to as much wear as the threads of the nut, it cannot fail to show the true condition of the latter.

It will be understood that, while the demountable sampler has been illustrated as a component part of the nut for facilitating its manufacture and accurate fitting, it equally admits of being mounted on the member being lifted and arranged to engage the screw at a point more or less remote from the nut. So also, while the drawings illustrate a non-rotatable nut, it will be perceived that the invention is applicable to the converse; in which case the insert may be secured directly to the nut and mounted so as to rotate as a unit therewith.

A modification of this invention whereby it is shown applicable to a rotatable nut, is represented by Figs. 4 and 5. In this case, the arm (represented in fragmentary sections by C) carries a shaft 18 which moves bodily with it and on which is mounted a worm 19 meshing with a worm-wheel 20 secured by a key 21 to a nut D, which has its intermediate portion 22 journaled in a suitable bearing 23 provided by the arm C. The nut is prevented from moving longitudinally by means of a collar E affixed thereto by a set screw 24, so as to restrain the worm wheel 20 from being displaced on the nut under its pressure against the shoulder 25. The lower end of the nut is enlarged to form a head 26 which provides a shoulder for the ball-bearing F which intervenes between the shoulder 27 of the arm C and the nut so as to carry the weight of the arm.

The parts are so arranged on the arm that the head 26 of the nut is exposed to view and is readily accessible to the user. This head 26, as shown best by Fig. 4, is provided with an aperture 28 leading direct into its bore. This aperture is enlarged at its outer end, as indicated by 29, so as to provide a shoulder 30 against which rests a counterpart shoulder on a plug G which, by means of bolts 31 and 32 is held rigidly in place. The plug is counterpart in shape to the cut-away portions of the nut and provides an inner portion 33 which terminates flush with the innermost circumference of the nut and is provided with portions of threads which precisely correspond to and mesh with the threads on the interior of the nut so as to form continuations thereof.

It will be seen that the plug is thus in threaded engagement with the screw H and is subjected to precisely the same wear as the threads of the nut. Whenever it is desired to ascertain the condition of such threads, the bolts 31 and 32 are removed and the plug is taken out and examined in precisely the same manner as the nut is inspected in the case of the first modification showing a fixed non-rotatable nut.

It will, accordingly, be seen that this invention, in a very simple manner, provides a means for enabling the user to obviate the dangers and accidents heretofore unavoidably attending the use of nuts for elevating ponderous parts; especially in case of machine-tools where the nut is concealed from view and comparatively inaccessible, and where it is quite a task to take down the lifting screw and remove the nut for scrutiny.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptation should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A machine-tool combining a bodily-movable member; a screw; a nut entirely circumscribing said screw and therewith cooperating to shift said member; and a part detachably mounted in a fixed relation to said nut and having a portion normally maintained in threaded relation with said screw so as to wear at a rate proportionate to the wear of the nut and thereby serve as a sample of the condition of said nut.

2. A device of the nature disclosed combining a rotatable screw; a member integrally encircling said screw and having a threaded connection therewith and adapted to be elevated thereby; and a part mounted to move as a unit with said member and having a portion normally held in threaded relation with said screw and adapted to be readily disengaged to display the wear occasioned by said screw.

3. A wear-exhibiting instrumentality comprising a member; a screw and a complete nut arranged to be relatively rotated to elevate said member; and an auxiliary element mounted in rigid relation with said nut to be movable in fixed relation therewith, said element providing an arcuate face in threaded engagement with said screw and adapted readily to be detached from said screw to afford an inspection of its arcuate face to enable the extent of wear of the threads of said nut to be ascertained.

4. A radial-drill combining an arm; a lifting-screw therefor; a complete nut mounted on said arm in engagement with said screw; and a detachable part mounted in unitary relation with said nut to be immovable relatively thereto, said part having a face partially encircling said screw and threaded thereto so as to wear at a rate equal to the wear of the nut.

5. A radial-drill combining an arm; a main nut rigidly secured thereto; a lifting screw threaded through said nut; and a fragmentary nut rigidly secured to said arm in threaded engagement with said screw, said fragmentary nut being adapted to be temporarily withdrawn to expose its threaded face, whereby the wear on said main nut may be determined.

6. A wear-determining instrumentality for elevating apparatus comprising in combination the member to be elevated; a nut and screw for elevating said member; and a relatively small insert detachably interfitting with said nut in unitary relation therewith, said insert presenting an arcuate face for threads forming continuations of the threads of the nut and positively held in engagement with said screw.

7. An indicator for obviating the stripping of threads resulting from wear comprising in combination a lifting screw; a nut threaded thereto, said nut having an aperture leading into its interior; and means arranged in conjunction with said aperture to enable the condition of the threads of the nut readily to be determined.

8. An indicator for enabling the stripping of threads to be obviated comprising a combination, a screw; a nut threaded thereto and having an aperture leading into its bore; and a plug interfitting in said aperture in fixed relation with said nut and having its inner end-face provided with threads constituting continuations of the threads of said nut, said plug being non-rotatably secured in said aperture and adapted to be non-rotatably drawn therefrom for purposes of inspection.

9. A machine-tool organization combining a frame-element adapted to be elevated; a nut non-translatably mounted in said frame-element; and a lifting screw projecting through said nut to co-operate therewith in elevating said frame element, said nut and frame-element having apertures in registry to afford access for inspection purposes into the interior of said nut.

In witness whereof, I hereunto subscribe my name, as attested by the two subscribing witnesses.

LAWRENCE LEE SCHAUER.

Witnesses:
C. C. SLETE,
ANNA HUSSIAN.